3,709,724
PROCESS FOR FINISHING LEATHER AND
SYNTHETIC LEATHER SUBSTITUTES
Guenter Eckert and Heinrich Hartman, Limburgerhof,
Matthias Marx, Bad Duerkheim, and Lothar Wuertele,
Ludwigshafen, Germany, assignors to Badische Anilin-
& Soda-Fabrik Aktiengesellschaft, Ludwigshafen
(Rhine), Germany
No Drawing. Filed Sept. 18, 1969, Ser. No. 859,174
Int. Cl. B44d 1/32
U.S. Cl. 117—142                              9 Claims

ABSTRACT OF THE DISCLOSURE

Finishing leather and synthetic leather substitutes with a solution in an inert organic solvent of: (I) copolymers containing hydroxyl groups of ethylenically unsaturated copolymerizable compounds containing hydroxyl groups and comonomers with contain groups which are inert to isocyanate groups; and (II) high molecular weight polyisocyanates derived from 2,4-toluylene diisocyanate and containing cyanurate rings and toluylene groups. During and after evaporation of the solvent the components (I) and (II) crosslink at room temperature in ten to twenty minutes. The leather finish obtained is substantially resistant to abrasion, impact and scratching and is substantially less susceptible to solvents than prior art leather finishes.

---

The present invention relates to a new process for finishing leather or synthetic leather substitutes. The materials finished according to the process are substantially more resistant to abrasion, impact and scratching and also substantially less susceptible to solvents than prior art finishes. They become less dirty and may be cleaned more easily. Such finishes are today generally described as easy-care.

The aim of every leather finish, which may also be called a leather dressing, is to impart to the leather a certain appearance and certain fastness properties. The finish thus affects the shade, the gloss, the levelness and the resistance of the leather to external mechanical and optical influences both in the production of the leather article and in its use.

It is known that leather may be coated with natural substances which have been modified and varied by chemical treatment. Thus for example finishes with casein dissolved in alkali can be made insoluble in water by appropriate treatment with acids and formaldehyde; nevertheless these finishes remain swellable in water and therefore susceptible to wetness.

Plasticizers are always incorporated into finishes containing nitrocellulose. Therefore in the case of finishes prepared in this way there is always the possibility that the plasticizers may migrate into the priming or into the leather so that the finish becomes brittle and cracked and in many cases the finish applied may even flake off. Nitrocellulose also has the great disadvantage from the point of view of processing that it burns easily. There is this disadvantage even after processing and for this reason for example leather which has been finished with a finishing agent containing nitrocellulose is not used for covering aircraft seats. It is known that nitrocellulose can be processed in the form of secondary emulsions thus removing the risk of easy combustibility at least during finishing, but finishes prepared with such emulsions are less fast to wetness, owing to the content of hydrophilic auxiliaries, than finishes which have been prepared on the basis of nitrocellulose in organic solvents.

Polymer dispersions are practically without importance as finishes because they do not have adequate abrasion and scratch resistance and neither are they sufficiently elastic for a final coating. Moreover the thermoplastic behavior of polymers limits their range of use.

It is known from British patent specification No. 939,-097 that fibrous materials, particularly those of synthetic fibrous substances, may be coated with a mixture of a copolymer containing hydroxyl groups based on diol monoacrylates and other copolymerizable compounds and reaction products of toluylene diisocyanate with polyalcohols having an excess of reactive isocyanate groups and the components crosslinked at from 60° to 160° C., advantageously at from 90° to 150° C. Without heat treatment, however, the drying times of such coatings are long so that textiles treated therewith cannot be stacked until after a long time. To accelerate the reaction it is possible to use known catalysts such as tertiary amines or organometallic compounds, but then the pot life of the mixtures is too short. The use of temperatures higher than about 80° C. for long periods to accelerate the crosslinking reaction is detrimental for leather and for synthetic leather substitutes.

We have now found that excellent easy-care leather and synthetic leather substitutes are obtained by applying to the material a solution of (I) a polyol and (II) a polyisocyanate in the organic solvent, which is inert to isocyanate groups and the polyol (I) and the polyisocyanate (II) are crosslinked during and after evaporation of the solvent, the improvement which comprises the polyol (I) being a copolymer containing hydroxyl groups, said copolymer comprising as comonomers, with reference to the total amount of monomers, (a) From 4 to 20% by weight of units of ethylenically unsaturated copolymerizable compounds containing at least one hydroxyl group;

(b) From 80 to 96% by weight of units of further ethylenically unsaturated copolymerizable compounds which bear groups inert to isocyanate groups;

(c) 0 to 13% by weight of units of dyes bearing at least one ethylenically unsaturated copolymerizable group; and the polyisocyanate (II) is a high molecular weight isocyanurate-isocyanate containing toluylene groups.

Monomers such as the monoesters of acrylic acid and/or methacrylic acid with aliphatic polyhydric alcohols such as aliphatic diols or polyols in which only one hydroxyl group is esterified are suitable as ethylenically unsaturated copolymerizable compounds (a) containing hydroxyl groups.

Among the monomers of this type, the monoesters of alkanediols such as the monoacrylates or monomethacrylates of ethylene glycol, 1,3 - propanediol, 1,2-propanediol and butanediol may be especially mentioned. Particularly preferred monomers of this type are ethylene glycol monoacrylate and monomethacrylate and 1,4-butanediol monoacrylate and monomethacrylate. Instead of, or in addition to, these it is also possible to use monoacrylates and monomethacrylates of polyalcohols such as glycerol and those diols and polyols which contain hydrocarbon chains interrupted by heteroatoms such as diethyl glycol or triethylene glycol. Polymerizable alcohols such as ally alcohol or buten-1-ol-3 are also suitable as monomers (a) containing hydroxyl groups. It is also possible for the coplymers containing hydroxyl groups to have incorporated therein (as comonomers) unsaturated thioethanols such as vinyl thioglycol, isopropenyl thioglycol or butanedienyl-2-thioglycol, N-methylol compounds of methacrylamide or acrylamide and vinylhydroxymethyl ketone. The copolymer containing hydroxyl groups may also have been built up with mixtures of monomers containing hydroxyl groups.

Suitable further ethylenically unsaturated copolymerizable compounds (b) are those which can be copolymerized with the monomers containing hydroxyl groups and whose groups are inert to isocyanate groups, i.e. do not react with these under the conditions of crosslinking. Suitable monomers (b) include: alkyl esters of acrylic or methacrylic acid having from one to 18, preferably from one to eight, carbon atoms in the alkyl radical, such as the acrylic or methacrylic esters of methanol, ethanol, butanol or 2-ethylhexanol, butyl acrylate being especially preferred; also nitriles such as acrylonitrile or methacrylonitrile, styrene, substituted styrenes such as α-methylstyrene, olefins such as butadiene or ethylene, vinyl ethers such as methyl vinyl ether, vinyl halides such as vinyl chloride and vinylidene chloride, acrylamide and methacrylamide and also their N-methylolalkyl ethers such as N-methylolacrylamide butyl ether. The monomers may of course also be copolymerized mixed with each other with a mixture of the ethylenically unsaturated compounds containing hydroxyl groups (a) and the dyes (c).

Azo and anthraquinone dyes are particularly suitable as the polymerizable dyes (c); azo metal complex dyes are also suitable.

The general constitution of azo dyes preferably used is reproduced by the formula:

A—N=N—B in which A denotes a phenyl or naphthyl radical and B denotes the usual radicals accessible to a coupling reaction. These groups A and B may be occupied by a great variety of auxochromic substituents such as fluorine, chlorine, bromine, hydroxyl, alkyl, alkoxy, carbalkoxy, cyano, nitro, carbonamido, amino, monoalkylamino, dialkylamino, sulfonyl, sulfatyl and sulfonamide groups. The polymerizable groups may be combined direct with the radicals A and B or with the auxochromic groups as for example in the case of β-acryloylethylamino groups or N-acryloylpiperazinyl groups. The same is true of azo metal complex dyes in which the groups A and B in ortho-position to the azo group have to bear complex-forming substituents. The 1:1 complexes and also pure or mixed 1:2 complexes with chromium, cobalt, copper, nickel and iron as the central atoms are suitable.

The same applies of course to anthraquinone dyes:

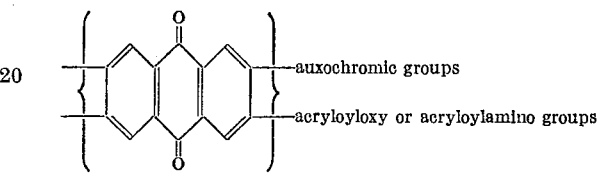

The following dyes are given as examples of suitable colored monomers representative of many other compounds of similar constitution:

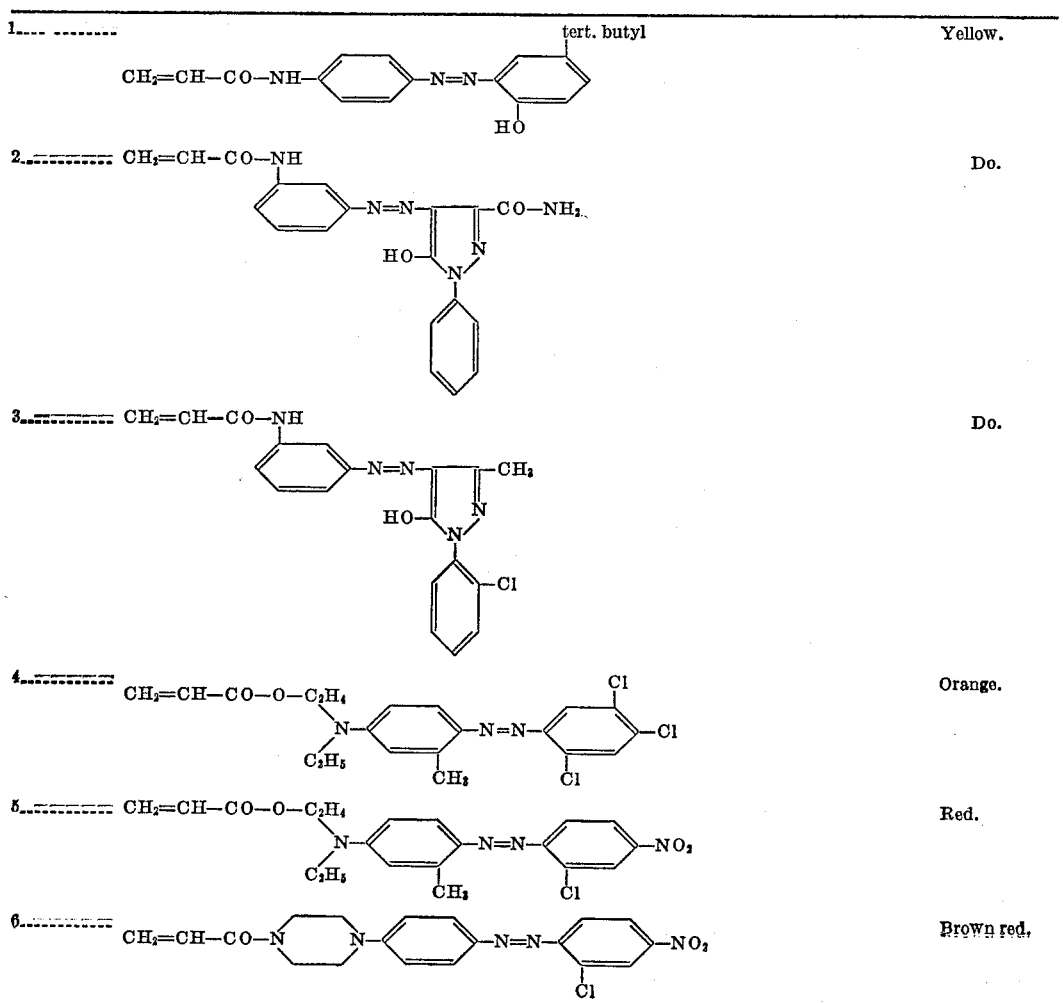

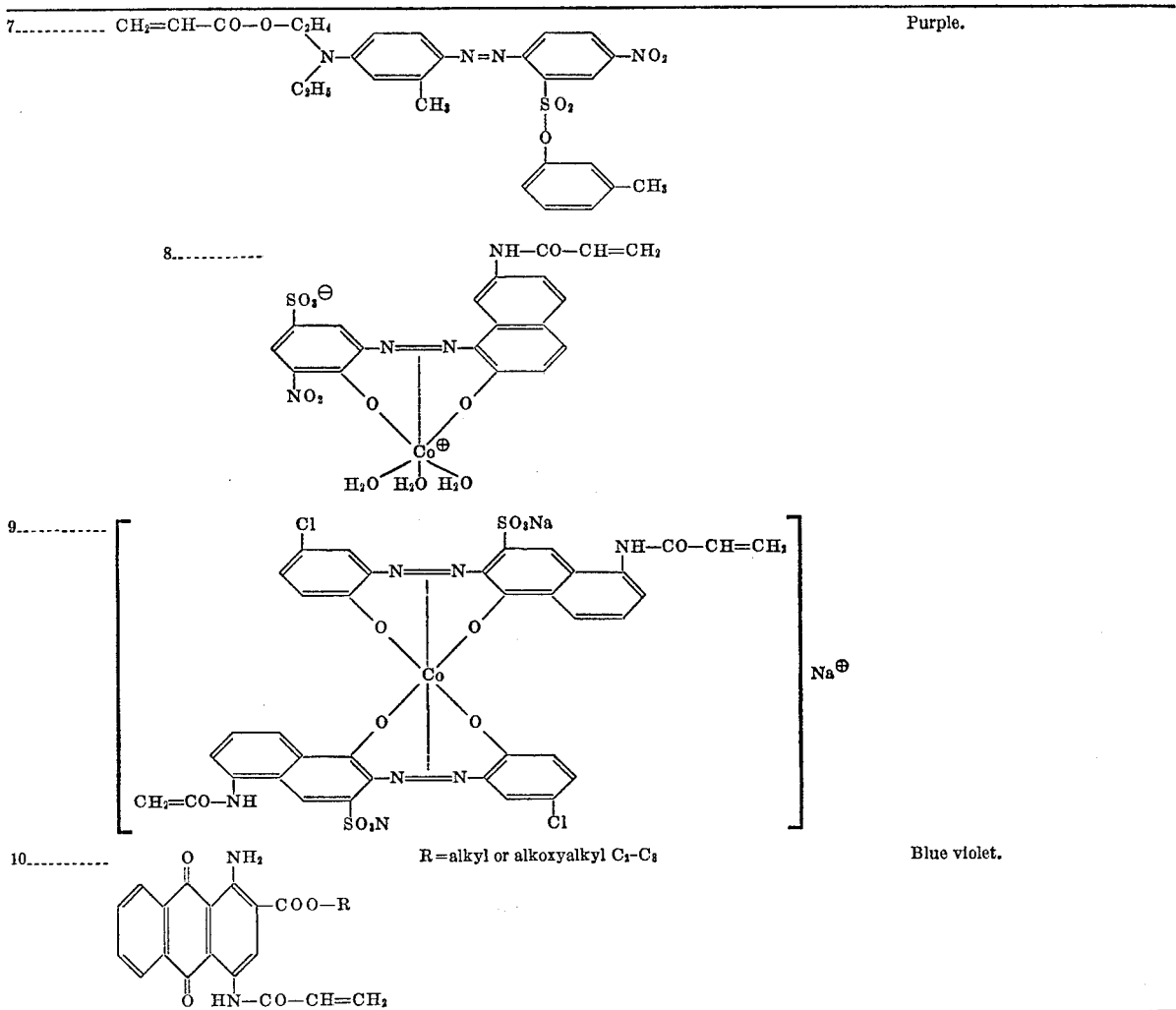

In order to obtain leather finishes having a soft and supple handle it is advantageous to use monomers which form soft homopolymers, such as n-butyl acrylate, as the main component of the inert monomers. Furthermore by varying the monomers containing hydroxyl groups (a) and their amount in the copolymer (I) the desired hardness of the coatings may be predetermined. The properties of the coatings may also be varied by using mixtures of various copolymers containing hydroxyl groups.

The copolymers containing hydroxyl groups advantageously contain (with reference to the total amount of comonomers) from 4 to 20% by weight, preferably from 5 to 15% by weight, of monomers containing hydroxyl groups and 40 to 80% by weight of alkyl acrylates. The colored copolymers bearing hydroxyl groups contain, in addition to the comonomers (a) and (b) up to 13%, preferably from 3 to 8%, by weight (with reference to the whole of the comonomers) of polymerizable dyes as further components.

Copolymers are obtained from the monomers by known methods, advantageously by solution polymerization. The conventional free-radical polymerization catalysts, such as organic peroxide, redox catalysts or, with special advantage, aliphatic azo compounds, particularly azodiisobutyronitrile, may be used. Any organic solvents used for the polymerization are those which are indifferent under the conditions of free-radical polymerization and also to isocyanates, i.e. do not contain any active hydrogen atoms. Examples of suitable solvents of this type are aliphatic esters such as ethyl acetate or ethyl glycol acetate, aromatic hydrocarbons such as toluene, ketones such as methyl ethyl ketone and ethers such as tetrahydrofuran.

Polyisocyanates containing high molecular weight aromatic groups which have been synthesized from toluylene diisocyanates (Fabre und Lack 73, No. 10 (1967), pages 909 to 915) are used according to the invention as polyisocyanates (II) for crosslinking the copolymers containing hydroxyl groups (I). There is thus formed in an addition reaction a cyanurate ring from three isocyanate groups (—N=C=O):

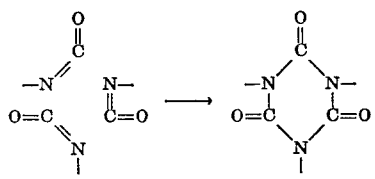

Polyisocyanates (II) to be used according to the invention contain from 8 to 18% by weight (with reference to the polyisocyanate) of free isocyanate groups. The viscosity of the solution of the polyisocyanates may serve as a measure of the molecular weight, i.e. the number of diisocyanate molecules incorporated in polymerized form into the high molecular weight polyisocyanates. The viscosity of a 50% by weight solution in butyl acetate should be from 1,400 to 1,800 centipoises (measured at 25° C.). These isocyanates containing high molecular weight isocyanurate rings and toluylene rings, which are also known as high molecular weight isocyanurate isocyanates have the advantage over polyisocyanates based on polyols and toluylene diisocyanate that with the copolymers containing hydroxyl groups (I) they dry very much more quickly. This is a considerable technical advance in the production of leather finishes.

The high molecular weight isocyanurate isocyanates may be added to a solution of the copolymer (I) in the usual way, for example, in the form of a solution in an inert organic solvent. It is advantageous to use a fairly readily volatile solvent such as ethyl acetate or butyl acetate for diluting the reaction mixture. To improve the flow when applying the mixture by spraying, a small amount of a high boiling solvent such as ethyl glycol acetate or butyl glycol acetate is added to the mixture. Solutions having a solids content of copolymer (I) and of isocyanurate isocyanate (II) of from 5 to 15% by weight are advantageously used for finishing leather.

Conventional assistants and additives such as plasticizers, pigments, flow improvers, delustrants and other binders such as phenoplast resins, aminoplast resins, alkyd resins, epoxide resins and polymer resins, may be added to these solutions.

When using the polyisocyanates (II) with the copolymers containing hydroxyl groups (I) it is advantageous to mix the components (I) and (II) in about equivalent amounts. For special finishes however it may be advantageous to use one reaction component in less than stoichiometric amount or in excess. When for example the copolymer (I) as hydroxy component is used in excess (up to about 40 mole percent with reference to the amount of reactive isocyanate groups), less strong crosslinking is achieved so that correspondingly more elastic finishes are obtained.

Finishes, which are usually applied as solutions of the copolymer (I) and the polyisocyanate (II) by spraying, brushing or padding, harden even at room temperature. In some cases it may be advantageous to carry out hardening at temperatures of up to about 50° to 80° C. so that the hardening (cure) time can be shortened accordingly. The cure may also be accelerated by adding conventional catalysts for reactions of isocyanate groups, for example by adding tertiary amines such as triethylamine or tin compounds such as dibutyl tin dilaurate.

Finishes prepared according to the invention by reaction of copolymers containing hydroxyl groups (I) with the said special isocyanates (II) and applies to leather or synthetic leather substitutes, for example those based on polyurethanes and known under the trademarks Corfam, Aztran, Xylee and Clarino, are distinguished by excellent bond strength and high resistance to solvents, water and soap solutions. The finishes also have excellent flexibility and are completely resistant to scratching and scouring. Abrasion resistance in the dry and wet condition is better than that of the best finishes based on nitrocellulose known at present.

The following examples illustrate the invention.

Parts and percentages specified in the following examples are by weight.

EXAMPLE 1

400 parts of isobutyl acetate and 10 parts of butyl glycol acetate are added to 50 parts of a 50% solution of a copolymer of 12.5 parts of butanediol monoacrylate, 22.5 parts of methyl methacrylate and 65 parts of n-butyl acrylate in ethyl acetate and mixed with 12 parts of a 50% solution of an isocyanurate isocyanate based on toluylene diisocyanate having an isocyanate content of 8% in ethyl acetate (viscosity of the solution about 1,700 cp. at 25° C.). The mixture is sprayed with a compressed air gun onto grain neat's upper leather which has been primed as usual. About fifteen minutes later the top finish is tackfree and the material can be stacked. The finish is insoluble in organic solvents, water and aqueous lye. In the flexometer test (in the Bally flexometer) no change (wrinkling, cracking or flaking) is observed after the material has been folded 70,000 times. Abrasion resistance (wet and dry) is excellent; after 5,000 revolutions with a Satra apparatus the finish is unchanged. When the mixture is sprayed onto a leather substitute based on polyamide, a finish is obtained having very good fastness and good elasticity.

When the polyisocyanates known from the coating industry and based on reaction products of polyols with an excess of toluylene diisocyanate are used instead of the said isocyanurate isocyanate, the finish prepared therewith does not become tackfree for several hours and the material is not stackable until then. Mixtures of (I) with such polyisocyanates are of no use for finishing leather because of the long drying times.

EXAMPLE 2

30 parts of the copolymer specified in Example 1 is mixed with 20 parts of a 50% solution of a copolymer from 10 parts of butanediol monoacrylate, 5 parts of methyl methacrylate, 20 parts of tertiary-butyl acrylate, and 65 parts of n-butyl acrylate in ethyl acetate, diluted with 600 parts of isobutyl acetate and 25 parts of ethyl glycol acetate and 11 parts of the polyisocyanate specified in Example 1 is added.

The mixture is sprayed onto willow side leather which has been primed as usual. A finish is obtained which is tackfree and stackable after about fifteen to twenty minutes. The bond strength of the topcoat and resistance to solvents, water and lyes are very good. Flexometer test: no change can be detected in the Bally flexometer after 70,000 folds. Dry and wet abrasion fastness of the finish corresponds to more than 5,000 and more than 4,000 revolutions respectively in the Satra apparatus.

The mixture is applied in the same way to a leather substitute material based on polyurethanes. Final finishes having outstanding fastness properties and solvent resistance are again obtained.

EXAMPLE 3

50 parts of a 49.8% solution of a copolymer from 9 parts of vinyl thioethanol, 12.5 parts of vinylidene chloride, 10 parts of methyl methacrylate and 68.5 parts of n-butyl acrylate in ethyl acetate have added to them 400 parts of isobutyl acetate 98/100 and 10 parts of ethyl glycol acetate and the whole is then mixed with 14 parts of a 50% solution of the isocyanurate isocyanate specified in Example 1. The mixture is sprayed onto a lining leather which has been primed as usual. After about twenty minutes at room temperature, the finish is tackfree so that the material can be stacked. Dry and wet abrasion resistance is more than 4,000 and 5,000 revolutions respectively in the Satra apparatus.

EXAMPLE 4

350 parts of isobutyl acetate and 20 parts of ethyl glycol acetate are added to 50 parts of a 50% solution of a copolymer from 7 parts of ethylene glycol monoacrylate, 5 parts of ethylene glycol monomethacrylate, 2 parts of butanediol-1,4-monovinyl ether, 25 parts of acrylonitrile, 40 parts of n-butyl acrylate and 20 parts of ethylhexyl acrylate (48%) in isobutyl acetate and the whole is mixed with 16 parts of a 50% solution of the isocyanurate isocyanate specified in Example 1. This mixture is sprayed onto buffed neat's leather which has been primed as usual. A finish is obtained which is tackfree after about twenty minutes. The dry and wet abrasion resistance is very good.

EXAMPLE 5

50 parts of a 50% solution of a copolymer from 7.5 parts of vinyl thioethanol, 10 parts of methyl methacrylate, 5 parts of acrylonitrile and 77.5 parts of ethyl acrylate in ethyl acetate have added to them 400 parts of isobutyl acetate 98/100 and 10 parts of ethyl glycol acetate and the whole is mixed with 11.5 parts of a 50% solution of the isocyanurate isocyanate specified in Example 1. This mixture is sprayed onto buffed neat's leather which has been primed as usual. The applied finish is tackfree and the material can be stacked after about twenty minutes. Dry and wet abrasion resistance is very good.

EXAMPLE 6

50 parts of a 50% solution of a copolymer from 12.5 parts of butanediol monoacrylate, 10 parts of acrylonitrile and 87.5 parts of ethyl acrylate in isobutyl acetate is mixed with 350 parts of isobutyl acetate and 20 parts of ethyl glycol acetate. The mixture has added to it 15.5 parts of a 40% solution of a polymerized cyanurate compound of toluylene diisocyanate having a content of 5.8% of isocyanate (calculated as —NCO and with reference to the solution) in n-butyl acetate and this is sprayed onto lining leather which has been primed as usual. About twenty minutes later the finish is tackfree and the material can be stacked. Dry and wet abrasion resistance of the finish is the same as that of the finish described in Example 3.

EXAMPLE 7

50 parts of a 48% solution of a copolymer from 9 parts of butanediol monoacrylate, 1 part of vinyl thioethanol, 20 parts of methyl methacrylate, 10 parts of tertiary butyl acrylate, 55 parts of n-butyl acrylate and 5 parts of the ethylenically unsaturated azo dye having the formula:

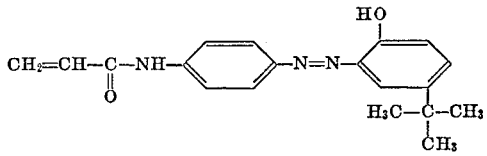

in ethyl acetate are mixed with 450 parts of butyl acetate and 15 parts of ethyl glycol acetate and then 11 parts of a 50% solution of the isocyanurate isocyanate specified in Example 1 is added. The mixture is sprayed onto neat's side leather which has been primed as usual. A brilliant yellow dressing is obtained which is tackfree after ten minutes and which is distinguished by very high abrasion resistance and wet fastness properties. The dye does not bleed in water.

When the same polymer is used but which contains, instead of the yellow dye, one of the dyes listed in the above table, colored finishes having very high abrasion resistance and wet fastness properties are obtained on leather.

EXAMPLE 8

A copolymer as described in Example 7 but containing, instead of the azo dye, 5 parts of the unsaturated anthraquinone dye having the formula:

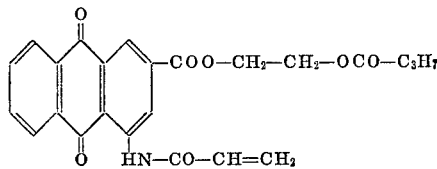

is used. Finishes prepared with this copolymer are blue violet in color, tackfree and the material can be stacked. Dry and wet abrasion resistance and fastness to bleeding are all excellent.

EXAMPLE 9

350 parts of isobutyl acetate 98/100 and 20 parts of ethyl glycol acetate are added to 50 parts of a 50% solution of a copolymer from 7 parts of propanediol monomethacrylate, 5 parts of ethylene glycol monoacrylate, 2 parts of butanediol-1,4-monovinyl ether, 25 parts of acrylonitrile, 40 parts of isobutyl acrylate and 20 parts of ethylhexyl acrylate (48%) in isobutyl acetate and the whole is mixed with 16 parts of a 50% solution of the isocyanurate isocyanate specified in Example 1. The mixture is sprayed as usual on primped, buffed neat's leather. The dressing (finish) is tackfree after about twenty minutes. Dry and wet abrasion resistance is very good.

EXAMPLE 10

400 parts of isobutyl acetate 98/100 and 10 parts of ethyl glycol acetate are added to 50 parts of a 50% solution of a copolymer from 7.5 parts of vinyl thioethanol, 10 parts of ethyl methacrylate, 5 parts of styrene and 77.5 parts of ethyl acrylate in ethyl acetate and the whole is mixed with 11 parts of a 50% solution of the isocyanurate isocyanate specified in Example 1. After it has been sprayed onto conventionally primed and buffed neat's leather, a finish is obtained which is tackfree and fast to stacking after about twenty minutes. Dry and wet abrasion resistance is like that of the finish in Example 3.

EXAMPLE 11

30 parts of the copolymer described in Example 1 is mixed with 20 parts of a 50% solution of a copolymer from 10 parts of butanediol-1,4-monoacrylate, 5 parts of methyl methacrylate, 20 parts of tertiary-butyl acrylate, 50 parts of n-butyl acrylate and 15 parts of vinyl chloride in ethyl acetate, diluted with 600 parts of isobutyl acetate 98/100 and 25 parts of ethyl glycol acetate and then 11 parts of the polyisocyanate specified in Example 1 is added.

The mixture is sprayed as described in Example 1 onto a primed grain neat's upper leather. The finish obtained has excellent dry and wet abrasion resistance.

What is claimed is:
1. A process for finishing leather or synthetic leather product with polyurethanes comprising: applying a solution of (1) polyols and (2) polyisocyanates in an organic solvent which is inert to isocyanate groups to said products and evaporating the solvent to crosslink said polyols and said polyisocyanates, said polyols (1) being represented by copolymers containing hydroxyl groups and comprising as comonomers
   (a) 4 to 20% by weight with reference to all comonomers of units of an ethylenically unsaturated copolymerizable compound bearing at least one hydroxy group, and
   (b) 80 to 96% by weight of units of an ethylenically unsaturated copolymerizable compound which bears groups which do not react with isocyanate groups, said polyisocyanates (2) being high molecular weight polyisocyanates which are derived from 2,4-toluylene diisocyanate and contain cyanurate groups and toluylene groups, said polyisocyanates further comprising from 8 to 18% by weight, with reference to the solid, of free isocyanate groups, said polyisocyanates having such a degree of polymerization that a solution of 50% by weight in butyl acetate has a viscosity of from 1,400 to 1,800 centipoises at 25° C.
2. A process as in claim 1 wherein the polyol (1) further comprises as comonomers besides (a) and (b), (c) up to 13% by weight of units of a dye which bears at least one olefinically unsaturated copolymerizable group.
3. A process as in claim 1 wherein the polyol (1) comprises as comonomers
   (a) 4 to 20% by weight of one or more comonomers selected from the group consisting of monoacrylates of ethylene glycol, propanediol and butanediol-1,4, monomethacrylates of ethylene glycol, propanediol and butanediol-1,4, vinylthioglycol and monovinylether of butanediol-1,4, and
   (b) 80 to 96% by weight of one or more comonomers selected from the group consisting of alkyl esters of acrylic acid and methacrylic acid with 1 to 8 carbon atoms in the alkyl group, acrylonitrile, methacrylonitrile, styrene, methyl vinyl ether, isobutyl vinyl ether, vinyl chloride and vinylidene chloride.

4. A process as in claim 1, wherein said polyol (1) contains as comonomers
5 to 15% by weight of (a) and
85 to 95% by weight of (b).

5. A process as in claim 2, wherein said polyol (1) contains as comonomers
5 to 15% by weight of (a)
77 to 92% by weight of (b) and
3 to 8% by weight of (c).

6. A process as in claim 2 wherein said comonomer (c) is an azoic dye which bears an acrylamide group or an arcylic ester group.

7. A process as in claim 2 wherein said comonomer (c) is an anthraquinone dye which bears an acrylamide group.

8. A process as in claim 1 wherein the amount of said polyol (1) is substantially stochiometric or in excess with reference to the free isocyanate group in said polyisocyanate (2).

9. A process as in claim 1 wherein said polyol (1) and said polyisocyanate (2) are dissolved in an organic solvent with a solids content of from 5 to 15% by weight.

References Cited

UNITED STATES PATENTS

| | | | |
|---|---|---|---|
| 3,137,671 | 6/1964 | Bosshard et al. | 117—143 X |
| 3,180,846 | 4/1965 | Haggis | 260—77.5 |
| 3,252,942 | 5/1966 | France et al. | 260—77.5 |
| 3,280,066 | 10/1966 | France et al. | 260—77.5 |
| 2,473,403 | 6/1949 | Woodward | 260—87.3 |

FOREIGN PATENTS

| | | |
|---|---|---|
| 939,097 | 10/1963 | Great Britain. |
| 852,646 | 10/1960 | Great Britain. |
| 877,402 | 9/1961 | Great Britain. |
| 889,349 | 10/1953 | Germany. |

WILLIAM D. MARTIN, Primary Examiner

T. G. DAVIS, Assistant Examiner

U.S. Cl. X.R.

117—161 KP, 161 UT